(12) United States Patent
Shigeta et al.

(10) Patent No.: US 8,241,418 B2
(45) Date of Patent: Aug. 14, 2012

(54) PRODUCING METHOD OF POWDER PARTICLES BY USING GRINDING MEDIUM

(75) Inventors: Kazuki Shigeta, Otsu (JP); Atsushi Ikeda, Otsu (JP)

(73) Assignee: TORAY Industries, Inc., Tokyo (JP)

( * ) Notice: Subject to any disclaimer, the term of this patent is extended or adjusted under 35 U.S.C. 154(b) by 126 days.

(21) Appl. No.: 12/224,426

(22) PCT Filed: Feb. 26, 2007

(86) PCT No.: PCT/JP2007/053465
§ 371 (c)(1), (2), (4) Date: Aug. 27, 2008

(87) PCT Pub. No.: WO2007/105466
PCT Pub. Date: Sep. 20, 2007

(65) Prior Publication Data
US 2009/0101737 A1   Apr. 23, 2009

(30) Foreign Application Priority Data
Feb. 27, 2006   (JP) ................................. 2000-049866

(51) Int. Cl.
*C04B 14/04* (2006.01)
(52) U.S. Cl. ........ 106/489; 313/461; 313/473; 313/478; 313/479; 313/480; 524/403; 524/413; 524/433; 524/494; 977/735; 977/742
(58) Field of Classification Search ................. 106/489; 501/32
See application file for complete search history.

(56) References Cited

U.S. PATENT DOCUMENTS

| | | | |
|---|---|---|---|
| 6,624,564 B2 * | 9/2003 | Wang et al. .................... 313/479 |
| 6,713,526 B2 * | 3/2004 | Dillon et al. ................... 522/182 |
| 6,847,337 B2 * | 1/2005 | Ichikawa ......................... 345/11 |
| 6,934,144 B2 * | 8/2005 | Ooma et al. .................. 361/303 |
| 2002/0190441 A1 * | 12/2002 | Billiet et al. ................... 264/669 |
| 2004/0126631 A1 * | 7/2004 | Uchida et al. ................... 429/13 |
| 2005/0101472 A1 * | 5/2005 | Yoshimura et al. .......... 501/96.4 |
| 2005/0176336 A1 * | 8/2005 | Lee et al. ......................... 445/50 |
| 2007/0295940 A1 * | 12/2007 | Chen et al. .................... 252/500 |

FOREIGN PATENT DOCUMENTS

| | | |
|---|---|---|
| JP | 9-253517 A | 9/1997 |
| JP | 10-137609 A | 5/1998 |
| JP | 2005-274865 A | 10/2005 |
| KR | 2003080770 A * | 10/2003 |

* cited by examiner

*Primary Examiner* — Jessica L Ward
*Assistant Examiner* — Ross J Christie
(74) *Attorney, Agent, or Firm* — Kubovcik & Kubovcik

(57) ABSTRACT

The present invention provides a producing method of powder particles having an average particle diameter on the order of submicrons. Specifically, the producing method is a producing method of powder particles obtained by grinding a product to be ground by using plural grinding media, wherein the grinding media including at least one kind (grinding medium A) having an average particle diameter of 0.01 to 5 times and at least one kind (grinding medium B) having an average particle diameter of 10 to 450 times, with respect to the average particle diameter of the product to be ground before being ground, are used.

4 Claims, 2 Drawing Sheets

US 8,241,418 B2

PRODUCING METHOD OF POWDER PARTICLES BY USING GRINDING MEDIUM

This application is a 371 of international application PCT/JP2007/053465 filed Feb. 26, 2007, which claims priority based on Japanese patent application No. 2006-049866 filed Feb. 27, 2006, which is incorporated herein by reference.

TECHNICAL FIELD

The present invention relates to a producing method for powder particles by using a grinding medium.

BACKGROUND ART

Producing methods for fine particles are roughly divided into two kinds of a bottom-up method for producing fine particles by nuclear growth and a top-down method for producing fine particles by grinding a large lump; the top-down method has been mostly used from the viewpoint of low costs and excellent high-volume production capability. One of methods for obtaining fine particles by the top-down method is a medium grinding method for grinding by using a medium. For example, in a ball mill using a ceramic ball as a medium, a grinding ball such as zirconia, a product to be ground, solvent, and optionally a dispersant are added into a vessel to move the grinding ball by revolving the vessel and then grind by shear force caused between the grinding balls (at a point of application) Accordingly, the larger the particle diameter of the grinding ball becomes and the heavier the weight of the ball becomes, the greater the shear force caused at the point of application becomes, so that sufficient grinding may be performed at the point of application. On the other hand, the smaller the particle diameter of the grinding ball becomes, the more the number of the points of application increases, so that grinding may be efficiently performed. However, there has been a problem that the larger particle diameter of the grinding ball for increasing the weight of the grinding ball decreases the number of the points of application, while the smaller particle diameter of the grinding ball for increasing the number of the points of application decreases the shear force at the point of application. Thus, the use of the grinding ball made of a substance as high in density as possible has made compatible the maintenance of the shear force and the increase of the number of the points of application. However, it has been difficult that a substance having an amorphous structure, such as glass particles, is ground to obtain particles having a particle diameter of 0.7 µm or less.

Then, the use of the grinding ball composed of plural kinds of particle diameters as a grinding medium has been proposed as a grinding method for efficiently obtaining fine particles; specifically, in a horizontal cylindrical mixing method, grinding is performed by complexly using two kinds or more of balls having different sizes of 10 to 100 times and 100 to 1000 times with respect to the diameter of particles to be ground to obtain micron-level powder particles (refer to Patent Document 1). However, the above-mentioned method did not allow particle diameter on the order of submicrons to be obtained.

Patent Document 1: Japanese Unexamined Patent Publication No. 9-253517 (claim 1 and so on)

DISCLOSURE OF THE INVENTION

[Problems to be Solved by the Invention]

The present invention is intended to provide a producing method of particles having an average particle diameter on the order of submicrons despite an amorphous structure.

[Means for Solving the Problem]

That is, the present invention is a producing method of powder particles obtained by grinding a product to be ground by using plural kinds of grinding media, wherein the grinding media including at least one kind (grinding medium A) having an average particle diameter of 0.01 to 5 times and at least one kind (grinding medium B) having an average particle diameter of 10 to 450 times, with respect to the average particle diameter of the product to be ground before being ground, are used.

In the present invention, the average particle diameters of the product to be ground and the grinding medium A signify arithmetic average particle diameters. The average particle diameter of the grinding medium B signifies cumulative 50% particle diameter ($D_{50}$), which denotes the particle diameter at a point where a volume cumulative curve becomes 50% when the volume cumulative curve is calculated by regarding the whole volume of a group of one pulverulent body as 100%.

[Effect Of The Invention]

According to the present invention, particles having an average particle diameter on the order of submicrons can be produced though the product to be ground has an amorphous structure.

BEST MODE FOR CARRYING OUT THE INVENTION

Figure 1:
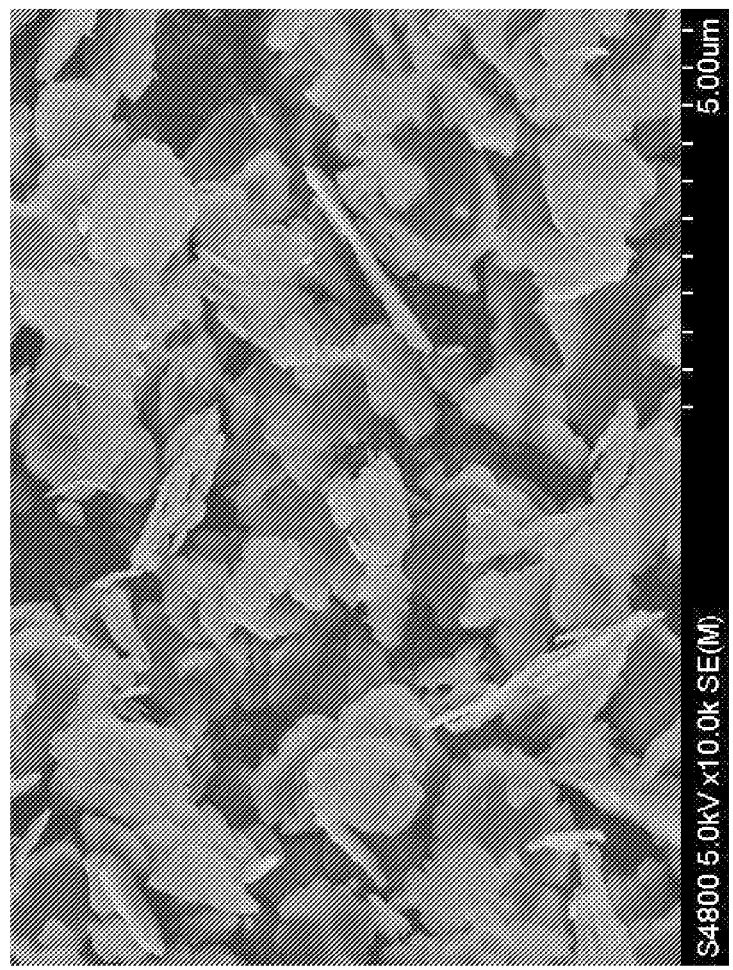
FIG. 1 is an SEM photograph of alkali glass ground by a conventional method.

The present invention is such that in producing powder particles by using plural kinds of media, a minute grinding medium (grinding medium A) having an average particle diameter of 0.01 to 5 times with respect to the average particle diameter of the product to be ground before being ground is used as one kind of the media, and a load-applying grinding medium (grinding medium B) having an average particle diameter of 10 to 450 times therewith is used as the other kind thereof.

A ball mill, a bead mill, a planetary ball mill and the like are used for grinding the product to be ground by using a medium, and a grinding ball, a grinding bead, and the like are used as the grinding medium A and the grinding medium B. Examples of those grinding ball and grinding bead include media made of agate, alumina, zirconia, titania, stainless steel, chromium steel and tungsten carbide. Zirconia is preferable from the viewpoint of high density and hardness. The following may be used for the grinding medium A: general grinding ball and grinding bead such as the above-mentioned alumina and titania as well as media made of oxides such as silica, zirconia, yttria, ceria, magnesia, zinc oxide, manganese oxide, copper oxide, iron oxide, holmium oxide, lead oxide and tin oxide, and glass having high softening temperature under load, which is higher in softening temperature under load than firing temperature. In particular, materials to be used later together with the ground product, and the materials to compose a composition together with the ground product are preferable. For example, in the case where the product to be ground is glass having low softening temperature under load used for the after-mentioned paste for field emission display, examples of the grinding medium include oxides and glass having high softening temperature under load, which may be used as a filler component in the paste. This is an aspect such as to act as the medium in grinding the product to be ground, be mixed into a composition without removing the medium, and act as a filler component later. According to the example, the grinding medium (such as oxides and glass having high softening temperature under load) acting for grinding glass having low softening temperature under load as the product to be ground to the size on the order of submicrons in grinding becomes a filler component in producing a composition without being removed, so that the simplification of processes may be intended.

In grinding the product to be ground by using the medium, there are a dry method for grinding by directly putting the product to be ground in the mill, and a wet method for grinding in a solution state such that the product to be ground is dispersed in solvent; the wet method is preferable by reason of being capable of grinding to smaller particle diameter.

In the present invention, the point of application for grinding may be dramatically increased by using the grinding medium A satisfying average particle diameter ratio in the above-mentioned range, that is, by using the grinding medium A being far smaller than the conventionally used grinding medium, with respect to the product to be ground before being ground. Also, the grinding medium B satisfying average particle diameter ratio in the above-mentioned range imposes a large load on the grinding medium A, so that great shear force may be caused. A technological idea such that the grinding media of different particle diameters are simultaneously used has existed conventionally; however, it has been generally considered that the small particle diameters of the grinding media brings small shear force between the grinding media to offer no effect of grinding, and that the use of the grinding media having small particle diameters renders difficult the separation of the grinding media and the ground product after the grinding, so that the grinding media having large particle diameters have been used. However, according to the present invention, the use of at least two kinds as described above of the grinding media together simultaneously allows the effect of an increase in the point of application for grinding and an increase in shear force at the point of application, which are contrary and have not been obtained in conventional grinding methods; as a result, particles having average particle diameter on the order of submicrons may be obtained.

If the average particle diameter ratio of the grinding medium A is less than 0.01 times, it is consequently too light for the product to be ground to obtain necessary shear force for grinding; more preferably, 0.1 times or more. On the other hand, if the average particle diameter ratio is more than 5 times, there is few points of application and particles having average particle diameter on the order of submicrons are not obtained; more preferably, 1 times or less.

If the average particle diameter ratio of the grinding medium B is less than 10 times, it is consequently too light to obtain sufficient shear force; preferably, 100 times or more for grinding more efficiently. On the other hand, if the average particle diameter ratio is more than 450 times, sufficient points of application with the grinding medium A are not obtained and particles having average particle diameter on the order of submicrons are not obtained; preferably, 300 times or less for grinding more efficiently.

Examples of a measuring method of average particle diameters of the product to be ground, the grinding media A and B include a method for measuring by a light scattering device and the like, and a method for calculating from image analysis of microphotographs. In measurement by a light scattering device, there is no problem in the case of no secondary agglomeration of fine particles, but there is a problem that the average particle diameter of primary particles is measured with difficulty in the case of causing secondary agglomeration. Then, in the present invention, a value calculated from image analysis of microphotographs is preferably used for average particle diameters of the product to be ground and the grinding medium A. The reason is that this method allows a value reflecting the average particle diameter of primary particles to be measured. For example, the particles measurable in length within a field of view are measured in length and averaged from photographs obtained by scanning electron microscopic (S4800, manufactured by Hitachi, Ltd.) observation. On the other hand, a measuring method for the average particle diameter of the grinding medium B is preferably a method for measuring by a light scattering device by reason of scarcely causing secondary agglomeration. For example, the average particle diameter may be measured by using a particle-size distribution measuring device (Microtrac 9320HRA, manufactured by Nikkiso Co., Ltd.).

The product to be ground and the grinding media may be distinguished by Vickers hardness, and the lowest Vickers hardness is regarded as that of the product to be ground. Vickers hardness may be measured with a test force of 9.807 N according to "Test methods for hardness of fine ceramics (JIS R1610: 2003)", and the average of measured values at five points may be used as Vickers hardness herein.

Also, the weight of one grinding medium B is preferably heavier than the weight of one grinding medium A. The reason is to achieve the purpose of the grinding medium B applying a load on the grinding medium A.

In addition, the grinding medium A is preferably added in a range of 1:0.1 to 100, regarding the whole volume of the product to be ground as 1. If a volume ratio of the grinding medium A is less than 0.1 in the mixture, sufficient points of application may not been obtained even though the average particle diameter is small, and if the volume ratio is more than 100, the yield of the particles to be obtained may be low for the reason that the amount of the product to be ground is too small. A range of 1:0.1 to 30 is preferable in view of micronizing the average particle diameter in a short time with favorable yield.

On the other hand, the grinding medium B is preferably added in a range of 1:0.1 to 100, regarding the whole volume of the product to be ground and the grinding medium A as 1. If a volume ratio of the grinding medium B is less than 0.1 in the mixture, the purpose that a load is applied on the grinding medium A can not be achieved, and if the volume ratio is more than 100, only a small amount of the product to be ground may be ground, which is not efficient. A range of 1:2.5 to 20 is more preferable. In the case of the wet method, at least the product to be ground, the grinding medium A and the grinding medium B are preferably added so as to be soaked in solvent.

In the present invention, examples of the product to be ground include glass, ceramics, carbon-based materials and pigments. Then, the present invention is particularly appropriately used in the case where the product to be ground is inorganic particles such as glass and ceramics.

With regard to the inorganic particles, the average particle diameter before being ground is preferably 0.1 to 1000 μm. If being less than 0.1 μm, it is not necessary to further grind for the reason that the average particle diameter is sufficiently small. Such small powder particles are produced by the bottom-up method. On the other hand, if the average particle diameter before being ground is more than 1000 μm, a grinding ball usable as the grinding medium B, such as zirconia, is available with difficulty, which is not preferable. The present invention particularly offers the effect when the average particle diameter of the inorganic particles before being ground is more than 0.7 μm and 10 μm or less. The reason is that conventional grinding methods occasionally achieve an average particle diameter of more than 0.7 μm and 10 μm or less, but is difficult to achieve 0.7 μm or less. For example, glass having a softening temperature under load of 300 to 500° C. and glass having a specific gravity of 2 to 4 became only flat even though being ground by the conventional methods, so that it was difficult to obtain particles having the average particle diameter on the intended order of submicrons. The reason is that the glass having the above-mentioned characteristics causes stickiness during grinding, thereby making the ground shape so flat as to absorb shear force.

Figure 2:
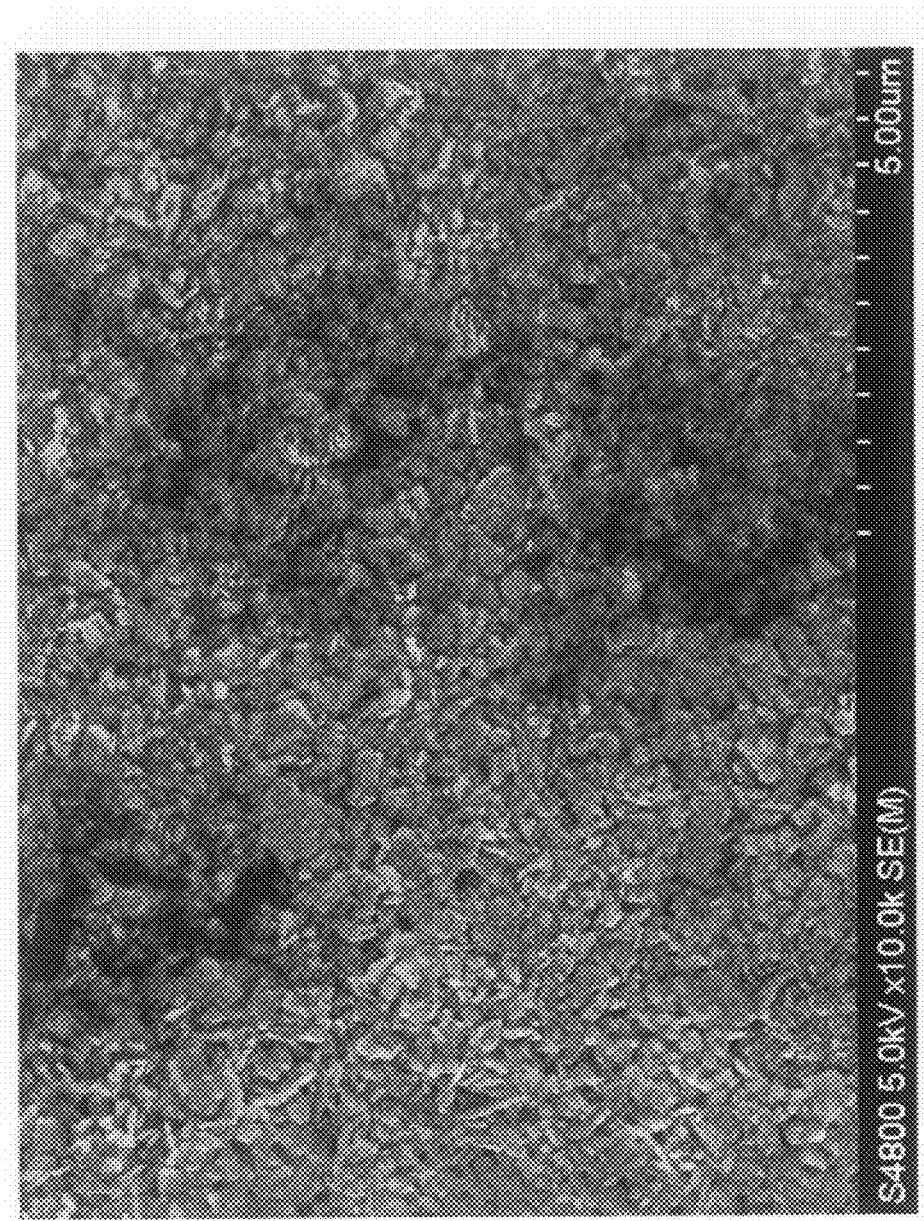
FIG. 2 is an SEM photograph of alkali glass ground by the method of the present invention.

An example that alkali glass having a softening temperature under load of 458° C., a specific gravity of 2.6 and an average particle diameter before being ground of 1.1 μm has been ground by planetary ball mill P-5, manufactured by Fritsch Japan Co., Ltd. is shown as a specific example in FIGS. 1 and 2. FIG. 1 is powders obtained by using terpineol as solvent, without grinding medium A, and zirconia bead of 0.3 mm as the grinding medium B at a mixing volume ratio of glass : the grinding medium B=1:20. On the other hand, FIG. 2 is powders obtained by using terpineol as solvent, titania bead having an average particle diameter of 0.26 μm as the grinding medium A, and zirconia bead of 0.3 mm as the grinding medium B at a mixing volume ratio of glass : the grinding medium A : the grinding medium B=1:4:20.

The method of the present invention will be specifically described hereinafter by taking, as an example, an aspect for grinding glass having low softening temperature under load by a planetary ball mill to produce powder particles.

First, glass having low softening temperature under load (the product to be ground), the grinding medium A, solvent, and optionally a dispersant are weighed and mixed at a predetermined mixing ratio to obtain a mixed liquid, which is stirred by ultrasonic irradiation or a homogenizer.

If the product to be ground is glass having low softening temperature under load, oxides or glass having high softening temperature under load usable as a filler in composing a composition later is prepared as the grinding medium A. Examples of oxides include silica, alumina, titania, zirconia, yttria, ceria, magnesia, zinc oxide, manganese oxide, copper oxide, iron oxide, holmium oxide, lead oxide and tin oxide. The grinding medium A may be used by one kind as well as two kinds or more, and the combination is not particularly limited.

Any of water, alcohol and organic solvent may be used for solvent, and these may be used by mixture. However, if the solvent is dried after grinding to collect the ground product as powder particles, the ground product frequently causes secondary agglomeration with each other during drying. Then, it is convenient in view of restraining secondary agglomeration of the ground product that solvent to be used in the produced composition be used, preserved in a slurry state, and directly used in the next process without being dried. Thus, solvent unnecessary to subject to drying process after grinding is favorably selected.

An anionic surfactant, a cationic surfactant, a nonionic surfactant, an amphiphilic polymer and a comb-shaped polymer may be used as a dispersant. The micronization of particles progresses by grinding, and then the new surface appeared by grinding is so active that secondary agglomeration is easily caused. The secondary agglomeration progresses, and then the energy for grinding is used for cracking the secondary agglomeration, so that a phenomenon in which the further micronization of particles is not allowed is occasionally caused. However, the addition of a dispersant allows the dispersant to be absorbed in the activated surface so promptly that the secondary agglomeration may be restrained.

The sum concentration of the product to be ground and the grinding medium A in the mixed liquid is preferably 5 to 40 vol %. If the sum concentration is less than 5 vol %, the yield of fine particles to be obtained tends to be low for the reason that the amount of the product to be ground is too small, and if the sum concentration is more than 40 vol %, the viscosity of the solution increases to disturb the motion of the product to be ground, the grinding medium A and the grinding medium B, so that it is difficult to obtain shear force necessary for grinding. The sum concentration is more preferably 10 to 30 vol %.

Next, the mixed liquid of the product to be ground, the grinding medium A, a dispersant and solvent is put into a grinding vessel made of zirconia or the like. Thereafter, a grinding ball made of zirconia or the like is added as the grinding medium B in a range of 1:0.1 to 100, regarding the whole volume of the product to be ground and the grinding medium A as 1. If the grinding medium B is not soaked in the solvent, the solvent is added until the grinding medium B is soaked therein. The grinding medium B is preferably of the same material as the grinding vessel. A solution such that the grinding medium B is added into the mixed liquid is hereinafter referred to as grinding solution.

The grinding vessel is sealed and thereafter set in a planetary ball mill device to allow the motion to the product to be ground, the grinding medium A and the grinding medium B in the vessel by revolving the vessel on its axis and there round at a predetermined number of revolutions. Centrifugal force applied to the grinding media by revolving on its axis and there round is preferably 1G or more, regarding gravitational acceleration in the vertical direction on the side face of the grinding vessel as G. The centrifugal force is more preferably 4G or more. If the centrifugal force is less than 1G, shear force necessary for grinding does not act on the point of application between the media, so that it is difficult to obtain particles having the average particle diameter on the intended order of submicrons.

After grinding for a predetermined time, the grinding medium B is removed from the grinding solution and the grinding medium A is optionally removed therefrom. The grinding medium B may be removed by subjecting to a filter. If the viscosity of the grinding solution is high and the removal rate by the filter is low, the grinding medium B is removed by pressure filtration or suction filtration. In the case of removing the grinding medium A, density, solubility and the like may be utilized. When the density differs between the grinding medium A and the ground product, the grinding medium A and the ground product may be separated by centrifugal separation or air classification after drying. For example, if the ground product is glass having low softening temperature under load, the ground product is so lower in density than zirconia used as the grinding medium A that a separation method by centrifugal separation or air classification after drying may be used. When the solubility differs between the grinding medium A and the ground product, the grinding medium A and the ground product may be separated by dissolving only the grinding medium A. For example, if the ground product is not dissolved in acid, the use of metal for the grinding medium A allows the grinding medium A to be also removed by dissolving the metal in the acid.

The powder particles composed of the ground product produced by the method as described above may be used for a composition appropriate for microprocessing. Examples of the composition include (1) a composition used as circuit materials and (2) a composition used for display members, for example, plasma display members such as a dielectric and a barrier rib, field emission display members such as an insulating layer and an electron-emissive layer, and surface-conduction electron-emitter display members such as an insulating layer. Preferable examples of a component of the composition include the powder particles composed of the ground product produced by the method of the present invention, binder resin and solvent. In the case of circuit materials and display members, examples thereof may include a filler.

In the present invention, the composition may contain carbon-based materials. Examples of carbon-based materials include carbon nanotube, carbon nanohorn, carbon nanocoil, fullerene and carbon black. Then, if the composition is used for field emission display, the composition preferably contains carbon nanotube, carbon nanohorn and carbon nanocoil capable of emitting electrons by applying voltage in a vacuum. Among them, carbon nanotube is used most appropriately by reason of being high in electron-emissive capacity as compared with carbon nanohorn and carbon nanocoil.

Carbon nanotube paste for field emission will be hereinafter described as an example of the composition containing the powder particles produced by the method of the present invention. Here, the powder particles obtained by the above-mentioned method are glass.

The carbon nanotube paste for field emission contains carbon nanotube as an electron-emissive source (hereinafter referred to as CNT), glass, binder resin, solvent and the like.

Single-layer or multilayer such as two-layer and three-layer CNT may be used for the CNT. The CNT of different number of layers may be used by mixture.

Glass (the above-mentioned powder particles) is necessary to provide an adhesive property of the CNT and a cathode substrate. Here, for example, in the case of producing carbon nanotube paste of a circular pattern with a diameter of 3 to 50 μm, the average particle diameter of the glass to be used is preferably 50 to 700 nm. If the average particle diameter is less than 50 nm, a firm matrix is not formed, and if the average particle diameter is more than 700 nm, surface roughness increases, resulting in non-uniformization of electron emission. The average particle diameter thereof is more preferably 70 to 600 nm.

The softening temperature under load of glass used for the carbon nanotube paste for field emission is preferably 500° C. or less. The reason is that the use of glass having a softening temperature under load of 500° C. or less allows soda-lime glass to be used as a glass substrate provided with an electron-emissive source or a barrier rib. If a softening temperature under load is more than 500° C., shift, warpage and crack of the pattern due to shrinkage of the glass substrate easily occur. Thus, glass used for the carbon nanotube paste for field emission preferably contains $Bi_2O_3$ by 45 to 86% by weight. Thus, the softening temperature under load of glass may be lowered to 450° C. or less. Though Bi is far lower in toxicity as compared with Pb as the main component of glass having low softening temperature under load, it is confirmed that Bi has similarity in many properties, so that the softening temperature under load of glass may be lowered in the same way as Pb. It is not preferable that $Bi_2O_3$ of less than 45% by weight bring a small effect of lowering the softening temperature under load while $Bi_2O_3$ of more than 86% by weight cause glass to be easily crystallized. $Bi_2O_3$ is more preferably 70 to 85% by weight.

The softening temperature under load of glass is regarded as temperature at the longest length of the TMA curve obtained by using a thermomechanical analyzer (for example, EXTER6000 TMA/SS, manufactured by Seiko Instruments Inc.) in such a manner that a load of 10 gram-weight are applied to each of glass rod and quartz glass rod of a standard sample, which are heated up from room temperature at a rate of 10° C./minute.

As long as $Bi_2O_3$ is contained in glass powder by 45 to 86% by weight, other compositions are not particularly limited. However, the glass powder preferably contains $Bi_2O_3$ by 45 to 86% by weight, $SiO_2$ by 0.5 to 8% by weight, $B_2O_3$ by 3 to 25% by weight and ZnO by 0 to 25% by weight in view of stability of glass and easy controlling of softening temperature under load.

The content of $SiO_2$ by 0.5 to 8% by weight allows stability of glass to be improved. If the content is less than 0.5% by weight, its effect is insufficient, and if the content is more than 8% by weight, the softening temperature under load of glass rises too much. The content is more preferably 0.5 to 2% by weight.

The content of $B_2O_3$ by 3 to 25% by weight also allows stability of glass to be improved. If the content is less than 3% by weight, its effect is insufficient, and if the content is more than 25% by weight, the softening temperature under load of glass rises too much. The content is more preferably 3 to 10% by weight.

ZnO may not be contained, and yet the content of up to 25% by weight allows softening temperature under load to be lowered. It is not preferable that the content is more than 25% by weight, because glass tends to be crystallized. The content is more preferably 5 to 15% by weight. In addition, $Al_2O_3$, $Na_2O$, CaO, MgO, CeO and $K_2O$ may be contained.

The composition of glass may be analyzed in the following manner. First, inorganic qualitative analysis is performed by an X-ray Spectrometer (for example, an energy dispersive X-ray Spectrometer MESA-500, manufactured by Horiba, Ltd.). Subsequently, quantitative analysis is performed for the detected elements by an ICP atomic emission Spectrometer (for example, ICP atomic emission Spectrometer SPS3000, manufactured by SII Nanotechnology Inc.) to determine the composition. Elements undetectable in principle (Li, B) and elements poor in sensitivity (Na, Mg and the like) are also examined by X-ray Spectrometry, and then quantified by an ICP atomic emission Spectrometer if they are the main components.

Examples of binder resin used for the carbon nanotube paste for field emission include cellulosic resin (such as ethyl cellulose, methyl cellulose, nitrocellulose, acetyl cellulose, cellulose propionate, hydroxypropyl cellulose, butyl cellulose, benzyl cellulose and modified cellulose), acrylic resin (a polymer composed of at least one kind of monomers such as acrylic acid, methacrylic acid, methyl acrylate, methyl methacrylate, ethyl acrylate, ethyl methacrylate, propyl acrylate, propyl methacrylate, isopropyl acrylate, isopropyl methacrylate, n-butyl acrylate, n-butyl methacrylate, tert-butyl acrylate, tert-butyl methacrylate, 2-hydroxyethyl acrylate, 2-hydroxyethyl methacrylate, 2-hydroxypropyl acrylate, 2-hydroxypropyl methacrylate, benzyl acrylate, benzyl methacrylate, phenoxyethyl acrylate, phenoxyethyl methacrylate, isobornyl acrylate, isobornyl methacrylate, glycidyl methacrylate, styrene, α-methyl styrene, 3-methyl styrene, 4-methyl styrene, acrylamide, methacrylamide, acrylonitrile and methacrylonitrile), ethylene-vinyl acetate copolymer resin, polyvinyl butyral, polyvinyl alcohol, propylene glycol, urethane resin, melamine resin, phenolic resin and alkyd resin.

Solvent used for the carbon nanotube paste is preferably one which dissolves an organic component contained in the paste. Examples thereof include polyhydric alcohols such as diol and triol typified by ethylene glycol and glycerin, and compounds obtained by etherifying and/or esterifying alcohol (ethylene glycol monoalkyl ether, ethylene glycol dialkyl ether, ethylene glycol alkyl ether acetate, diethylene glycol monoalkyl ether acetate, diethylene glycol dialkyl ether, propylene glycol monoalkyl ether, propylene glycol dialkyl ether and propylene glycol alkyl ether acetate). The following are used more specifically: terpineol, ethylene glycol monomethyl ether, ethylene glycol monoethyl ether, ethylene glycol monopropyl ether, ethylene glycol monobutyl ether, diethylene glycol dimethyl ether, diethylene glycol diethyl ether, ethylene glycol dipropyl ether, diethylene glycol dibutyl ether, methyl cellosolve acetate, ethyl cellosolve acetate, propyl cellosolve acetate, butyl cellosolve acetate, propylene glycol monomethyl ether acetate, propylene glycol monoethyl ether acetate, propylene glycol monopropyl ether acetate, 2,2,4-trimethyl-1,3-pentanediol monoisobutyrate, butyl carbitol acetate and organic solvent mixture containing one or more kinds of these.

The carbon nanotube paste for field emission may contain CNT, glass, binder resin and solvent as well as a dispersant properly.

A dispersant used for the carbon nanotube paste is preferably an amine comb-shaped block copolymer. Examples of the amine comb-shaped block copolymer include Solsperse 13240, Solsperse 13650, Solsperse 13940, Solsperse 24000SC, Solsperse 24000GR and Solsperse 28000 (trade names) (produced by Avecia Inc.).

Photosensitivity may be given to the carbon nanotube paste for field emission, and patterning may be performed through exposure and development by containing a photosensitive organic component. Either of the following may be selected as the photosensitive organic component: a negative photosensitive organic component, which is soluble in developing solution before being irradiated with ultraviolet rays and then becomes insoluble in developing solution after being exposed thereto by the occurrence of chemical change in irradiating with ultraviolet rays; and a positive photosensitive organic component, which is insoluble in developing solution before being irradiated with ultraviolet rays and then becomes soluble in developing solution after being exposed thereto by the same manner; in particular, the negative photosensitive organic component may be appropriately used. The negative photosensitive organic component contains a photosensitive component selected from at least one kind of a photosensitive polymer, a photosensitive oligomer and a photosensitive monomer, and it is also preferable to optionally add a component acting as binder resin, photoinitiator, ultraviolet absorbing agent, sensitizer, sensitizing assistant, polymerization inhibitor, plasticizer, thickener, antioxidant, dispersant, organic or inorganic suspending agent or leveling agent.

The photosensitive polymer used for the carbon nanotube paste for field emission generally has also a function as a binder resin. The photosensitive polymer preferably has a carboxyl group. A polymer having a carboxyl group is obtained in such a manner that carboxyl group-containing monomer such as acrylic acid, methacrylic acid, itaconic acid, crotonic acid, maleic acid, fumaric acid, vinylacetic acid or acid anhydrides thereof, and monomers such as methacrylate, acrylate, styrene, acrylonitrile, vinyl acetate or 2-hydroxy acrylate is selected and copolymerized by using an initiator such as azobisisobutyronitrile.

A copolymer having (meth)acrylate and (meth) acrylic acid as copolymerizable components is preferably used as the polymer having a carboxyl group for the reason that pyrolysis temperature in firing is low. Above all, a styrene/methyl methacrylate/methacrylic acid copolymer is preferably used.

The resin acid value of the copolymer having a carboxyl group is preferably 50 to 150 mgKOH/g. If the acid value is more than 150, development permissible width is narrowed. If the acid value is less than 50, solubility of an unexposed portion in developing solution decreases. If concentration of developing solution is higher, peeling in an exposed portion occurs, and it becomes difficult to obtain a high-resolution pattern.

The photosensitive polymer preferably has an ethylenically unsaturated group in a side chain. Examples of a method for introducing an ethylenically unsaturated bond into a side chain include a method for reacting an ethylenically unsaturated compound having a glycidyl group and an isocyanate group, acrylic acid chloride, methacrylic acid chloride or allyl chloride, and carboxylic acid such as maleic acid with a mercapto group, an amino group, a hydroxyl group and a carboxyl group in the polymer.

Examples of the ethylenically unsaturated compound having a glycidyl group include glycidyl acrylate, glycidyl methacrylate, allyl glycidyl ether, glycidyl ethyl acrylate, crotonyl glycidyl ether, glycidyl crotonate ether and glycidyl isocrotonate ether. Above all, a compound having the structure of $CH_2=C(CH_3)COOCH_2CHOHCH_2-$ is preferably used.

Examples of the ethylenically unsaturated compound having an isocyanate group include (meth)acryloyl isocyanate and (meth)acryloyl ethylisocyanate.

The ethylenically unsaturated compound having a glycidyl group or an isocyanate group, and acrylic acid chloride, methacrylic acid chloride or allyl chloride are preferably reacted by 0.05 to 1 molar equivalent with a mercapto group, an amino group, a hydroxyl group or a carboxyl group in the polymer.

The preparation of an amine compound having an ethylenically unsaturated bond may be performed by reacting glycidyl (meth)acrylate, (meth)acrylic acid chloride, or (meth)acrylic anhydride having an ethylenically unsaturated bond with an amino compound. A plurality of compounds containing an ethylenically unsaturated group may be used by mixture.

A photoreactive compound containing a carbon-to-carbon unsaturated bond may be used as specific examples of the photosensitive monomer; examples thereof include (1) acrylate or methacrylate of alcohols (such as ethanol, propanol, hexanol, octanol, cyclohexanol, glycerin, trimethylolpropane and pentaerythritol), (2) a reaction product of (a) carboxylic acids (such as acetic acid, propionic acid, benzoic acid, acrylic acid, methacrylic acid, succinic acid, maleic acid, phthalic acid, tartaric acid and citric acid) with (b) glycidyl acrylate, glycidyl methacrylate, allyl glycidyl or tetraglycidyl methexylylenediamine, and (3) a reaction product of (a) amide derivatives (such as acrylamide, methacrylamide, N-methylolacrylamide and methylene bisacrylamide) or an epoxy compound with (b) acrylic acid or methacrylic acid. In the polyfunctional photosensitive monomer, acryl, methacryl, vinyl and allyl group may exist by mixture in an unsaturated group.

The photosensitive monomer may be used by one kind, or two kinds or more. The photosensitive monomer is added in a range of preferably 2 to 40% by weight, more preferably 5 to 30% by weight with respect to the total photosensitive organic component. If the amount of the photosensitive monomer is too small, photo-curing shortage tends to occur, the sensitivity of an exposed portion decreases, and development resistance decreases. If the amount of the photosensitive monomer is too much, solubility of an unexposed portion in water decreases, and there is a possibility of causing failure due to removal of binder in firing due to too high crosslink density.

The photoinitiator used for the carbon nanotube paste for field emission is selected from those causing radical species. Examples of the photoinitiator include (a) diethoxyacetophenone, 2-hydroxy-2-methyl-1-phenylpropane-1-one, benzyldimethylketal, 1-(4-isopropylphenyl)-2-hydroxy-2-methylpropane-1-one, 4-(2-hydroxyethoxy)phenyl-(2-hydroxy-2-propyl)ketone, 1-hydroxycyclohexyl-phenyl ketone, 1-phenyl-1,2-propanedione-2-(ortho-ethoxycarbonyl) oxime, 2-methyl-[4-(methylthio)phenyl]-2-morpholinopropane-1-one, 2-benzyl-2-dimethylamino-1-(4-morpholinophenyl)-butanone-1, benzoin, benzoin methyl ether, benzoin ethyl ether, benzoin isopropyl ether, benzoin isobutyl ether, benzophenone, methyl ortho-benzoylbenzoate, 4-phenyl benzophenone, 4,4-dichloro benzophenone, hydroxybenzophenone, 4-benzoyl-4'-methyl-diphenyl sulfide, alkylated benzophenone, 3,3',4,4'-tetra(tert-butylperoxycarbonyl)benzophenone, 4-benzoyl-N,N-dimethyl-N-[2-(1-oxo-2-propenyloxy)ethyl]benzene methanaminium bromide, (4-benzoylbenzyl)trimethyl ammonium chloride, 2-hydroxy-3-(4-benzoylphenoxy)-N,N,N-trimethyl-1-propene aminium chloride monohydrate, 2-isopropylthioxanthone, 2,4-dimethylthioxanthone, 2,4-diethylthioxanthone, 2,4-dichlorothioxanthone, 2-hydroxy-3-(3,4-dimethyl-9-oxo-9H-thioxanthene-2-yloxy)-N,N,N-trimethyl-1-propanaminium chloride, 2,4,6-trimethylbenzoylphenylphosphineocide, 2,2'-bis(ortho-chlorophenyl)-4,5,4',5'-tetraphenyl-1,2-biimidaz, 10-butyl-2-chloroacridone, 2-ethylanthraquinone, benzyl, 9,10-phenanthrenequinone, camphorquinone, methylphenylglyoxyester, η5-cyclopentadienyl-η6-cumenyl-iron(1+)-hexafluorophosphate(1−), diphenyl sulfide derivative, bis (η5-2,4-cyclopentadiene-1-yl)-bis(2,6-difluoro-3-(1H-pyrrole-1-yl)-phenyl)titanium, 4,4-bis(dimethylamino) benzophenone, 4,4-bis(diethylamino)benzophenone, thioxanthone, 2-methylthioxanthone, 2-chlorothioxanthone, 4-benzoyl-4-methyl phenyl ketone, dibenzyl ketone, fluorenone, 2,3-diethoxyacetophenone, 2,2-dimethoxy-2-phenyl-2-phenylacetophenone, 2-hydroxy-2-methylpropiophenone, para-tert-butyldichloroacetophenone, benzylmethoxyethyl acetal, anthraquinone, 2-tert-butylanthraquinone, 2-aminoanthraquinone, β-chloroanthraquinone, anthrone, benzanthrone, dibenzsuberone, methylene anthrone, 4-azidebenzalacetophenone, 2,6-bis(para-azidobenzylidene)cyclohexane, 2,6-bis(para-azidobenzylidene)-4-methylcyclohexanone, 2-phenyl-1,2-butadione-2-(ortho-methoxycarbonyl)oxime, 1,3-diphenylpropanetrione-2-(ortho-ethoxycarbonyl)oxime, N-phenylglycine, tetrabutylammonium(+1)$_n$-butyltriphenyl borate(1−), naphthalene sulfonyl chloride, quinoline sulfonyl chloride, N-phenylthioacridone, 4,4-azobisisobutyronitrile, benzthiazole disulfide, triphenylphosphine, carbon tetrabromide, tribromophenylsulfone and benzoyl peroxide, and a combination of those described in (a), and (b) photoreducible coloring matter such as eosine and methylene blue or (c) reducing agent such as ascorbic acid and triethanolamine.

These photoinitiators may be used by one kind, or two kinds or more. The photoinitiator is added in a range of 0.05 to 10% by weight, more preferably 0.1 to 10% by weight with respect to the photosensitive organic component. If the amount of the photoinitiator is too small, light sensitivity is poor, and if the amount of the photoinitiator is too large, there is a possibility of decreasing residual rate of an exposed portion.

The use of a sensitizer together with the photoinitiator allows the sensitivity to be improved and wavelength range effective for the reaction to be expanded.

Specific examples of the sensitizer include 2,4-dimethylthioxanthone, 2,4-diethylthioxanthone, 2-isopropylthioxanthone, 2,3-bis(4-diethylaminobenzal)cyclopentanone, 2,6-bis(4-dimethylaminobenzal)cyclohexanone, 2,6-bis(4-dimethylaminobenzal)-4-methylcyclohexanone, Michler's ketone, 4,4-bis(diethylamino)benzophenone, 4,4-bis(dimethylamino)chalcone, 4,4-bis(diethylamino)chalcone, para-dimethylaminocinnamylideneindanone, para-dimethylaminobenzylideneindanone, 2-(para-dimethylaminophenylvinylene)isonaphthothiazole, 1,3-bis (4-dimethylaminophenylvinylene)isonaphthothiazole, 1,3-bis(4-dimethylaminobenzal)acetone, 1,3-carbonylbis(4-diethylaminobenzal)acetone, 3,3-carbonylbis(7-diethylaminocoumarin), triethanolamine, methyldiethanolamine, tri-isopropanolamine, N-phenyl-N-ethyl ethanolamine, N-phenyl ethanolamine, N-tolyldiethanolamine, methyl 4-dimethylaminobenzoate, ethyl 4-dimethylaminobenzoate, isoamyl dimethylaminobenzoate, isoamyl diethylaminobenzoate, (2-dimethylamino)ethyl benzoate, (n-butoxy)ethyl 4-dimethylaminobenzoate, 2-ethylhexyl 4-dimethylaminobenzoate, 3-phenyl-5-benzoylthiotetrazole and 1-phenyl-5-ethoxycarbonylthiotetrazole.

These sensitizers may be used by one kind, or two kinds or more. Some sensitizers may be also used as the photoinitiator. In the case of adding the sensitizer to photosensitive paste, the added amount thereof is usually 0.05 to 10% by weight, more preferably 0.1 to 10% by weight with respect to the photosensitive organic component. If the amount of the sensitizer is too small, an effect of improving light sensitivity is not exerted, and if the amount of the sensitizer is too large, there is a possibility of decreasing residual rate of an exposed portion.

The carbon nanotube paste for field emission may be produced in such a manner that each kind of components is prepared so as to have a predetermined composition, and thereafter homogeneously mixed and dispersed by kneaders such as a three-wheel roller, a ball mill and a bead mill. The paste viscosity is properly adjusted by additive ratio of glass, thickener, organic solvent, plasticizer and suspending agent, and the range thereof is preferably 2 to 200 Pa·s in the case of patterning by using a slit die coater method and a screen printing method. On the other hand, the range is preferably 0.001 to 5 Pa~s in the case of patterning by using a spin coat method and a spray method.

A producing method for a triode type electron emitter for field emission by using the carbon nanotube paste for field emission will be hereinafter described. The production of the electron emitter may be performed by other known methods and is not limited to the after-mentioned producing method.

First, a back substrate is produced. A conductive film such as ITO is formed on a glass substrate made of, for example, soda-lime glass or PD200 produced by Asahi Glass Co., Ltd. as heat-resistant glass for PDP to form a cathode electrode. Subsequently, an insulating material is laminated with a thickness of 5 to 15 μm by a printing method to produce an insulating layer. Next, a gate electrode layer is formed on the insulating layer by a vacuum deposition method. An emitter hole pattern is produced by applying a resist on the gate electrode layer and etching the gate electrode and the insulating layer with exposure and development. Thereafter, a composition containing powder particles obtained by the present invention (the carbon nanotube paste for field emission) is applied by a screen printing method or a slit die boater method. The composition is developed after top exposure or back exposure to form an electron emission source pattern in the emitter hole, and the resulting pattern is fired at a temperature of 400 to 500° C. Finally, raising treatment of the CNT film is performed by a laser irradiation method or a tape peeling method.

Next, a front substrate is produced. ITO is formed on a glass substrate made of, for example, soda-lime glass or PD200 produced by Asahi Glass Co., Ltd. as heat-resistant glass for PDP to form an anode electrode. Phosphor in red, green and blue as well as white is laminated by a printing method on the anode electrode.

Thereafter, the back substrate and the front substrate are stuck together having spacer glass between them, and evacuated by an exhaust pipe connected to the vessel, so that a triode type electron emitter may be produced. In order to confirm the electron emission state, a voltage of 1 to 5 kV is supplied to the anode electrode, so that electrons are emitted from the CNT and phosphor luminescence may be obtained.

The electron emitter thus produced may be used as a backlight of liquid crystal display by installing a driver therein and being placed on the back face of a liquid crystal panel. When the electron emitter, in which phosphor in red, green and blue is printed in each picture element, is attached with a driver, it may be used as a field emission display.

EXAMPLES

The present invention will be specifically described hereinafter by examples, but it is not limited thereto.

<Grinding Method>

The product to be ground and the grinding medium A were mixed in accordance with materials and ratios described in Tables 1 to 5 to prepare a mixed liquid by using terpineol as solvent so that the product to be ground was 20% by weight. Subsequently, 90 ml of the mixed liquid was put into Dyno-Mill (manufactured by Shinmaru Enterprises Co.) filled with the grinding medium B described in Table 1 up to 85 vol % (510 ml) of the vessel capacity. An agitator disk of 64 mmϕ was set at a peripheral speed of 10.5 m/s in a state that the feed liquid vent and the waste liquid vent of the vessel were stoppered to seal the grinding solution in the vessel, and then the grinding was performed for 180 minutes. After grinding, suction filtration was performed with a mesh filter of SUS#150 to remove the grinding medium B from the grinding solution.

<Measuring Method of Surface Roughness Ra>

In Example 26 and Comparative Example 8, the surface roughness was measured by the following method.

The surface roughness Ra on the electron emitter surface was measured in a stylus type in accordance with JIS B0601-1982 with Surfcom 1400 manufactured by Tokyo Seimitsu Co., Ltd.

<Measuring Method of Average Particle Diameter of the Product to be Ground and the Grinding Medium A>

(1) The average particle diameter of the product to be ground and the grinding medium A before and after being ground was measured in length from the image basically with a scanning electron microscope (S4800, manufactured by Hitachi, Ltd.). The diameter of all particles measurable in length within a visual field of 20 μm×20 μm was measured to calculate the average value by dividing by the number of measurements. If the shape of fine particles was indefinite, the longest one of lines on the center of the particles was regarded as the diameter.

In Examples 1 to 6, 8 and 14 to 24 and Comparative Examples 2 to 4, the average particle diameter of the ground product after being ground was measured in a state that the grinding medium A and the ground product were mixed. That is, the average particle diameter of all particles photographed within the visual field was measured by the above-mentioned method to further calculate the average particle diameter (R) of the ground product after being ground from the following equation by using the volume fractions of the ground product and the grinding medium A. It was assumed that the grinding medium A was not ground.

$$R = \{A - rX_r^{2/3}/(X_r^{2/3} + X_R^{2/3})\}/\{X_R/(X_r^{2/3} + X_R^{2/3})\}$$

A is the average particle diameter of a mixture of the ground product and the grinding medium A, r is the average particle diameter of the grinding medium A, $X_r$ and $X_R$ are the volume fractions of the grinding medium A and the ground product, respectively, and $X_r + X_R = 1$.

In Examples 7 and 9 to 13 and Comparative Examples 5 and 6, the grinding medium A was also ground, so that the average particle diameter of the ground product after being ground might not be specified by applying the expression. Thus, the ground product and the grinding medium A were distinguished by the difference of shape and surface state by way of the image obtained from the microscope to measure the diameter of all of the ground products after being ground measurable in length within a visual field of 20 μm×20 μm, and then calculate the average value. The case where the average particle diameter of powder particles was 0.7 μm or less was regarded as pass.

<Measuring Method of Average Particle Diameter of the Grinding Medium B>

The average particle diameter of the grinding medium B was measured with a particle-size distribution measuring device (Microtrac 9320HRA, manufactured by Nikkiso Co., Ltd.). The average particle diameter measured with the particle-size distribution measuring device is cumulative 50% particle diameter ($D_{50}$)

<Materials>

(1) Glass

Glass 1: bismuth glass (bismuth oxide: 50 wt %, boron oxide: 21 wt %, silicon oxide: 7 wt %, zinc oxide: 22 wt %), softening temperature under load of 447° C., average particle diameter of 0.8 μm, Vickers hardness of 5 GPa Glass 2: alkaline glass (boron oxide: 35 wt %, aluminum oxide: 22.7 wt %, silicon oxide: 12.9 wt %, lithium oxide: 12.4 wt %, magnesium oxide: 6.4 wt %, barium oxide: 4.2 wt %, calcium oxide: 4.1 wt %, zinc oxide: 2.3 wt %), softening temperature under load of 458° C., average particle diameter of 1.1 μm, Vickers hardness of 5 GPa Glass 3: bismuth glass (bismuth oxide: 75 wt %, boron oxide: 7 wt %, silicon oxide: 2 wt %, zirconium oxide: 12 wt %), glass softening temperature under load of 380° C., average particle diameter of 2.1 μm, Vickers hardness of 4 GPa Glass 4: bismuth glass (bismuth oxide: 75 wt %, boron oxide: 0.9 wt %, silicon oxide: 1.9 wt %, zinc oxide: 12 wt %, aluminum oxide: 0.2 wt %, sodium oxide: 4 wt %), softening temperature under load of 394° C., average particle diameter of 5 μm, Vickers hardness of 4 GPa Glass 5: bismuth glass (bismuth oxide: 85 wt %, boron oxide: 4 wt %, silicon oxide: 1.5 wt %, zinc oxide: 9.5 wt %), softening temperature under load of 415° C., average particle diameter of 9 μm, Vickers hardness of 4.5 GPa (2) The Grinding Medium A The grinding medium A1: titania (average particle diameter of 0.013 μm, Vickers hardness of 7.5 GPa, titanium dioxide C produced by Nippon Aerosil Co., Ltd.)

The grinding medium A2: alumina (average particle diameter of 0.021 μm, Vickers hardness of 15 GPa, aluminum oxide P25 produced by Nippon Aerosil Co., Ltd.)

The grinding medium A3: titania (average particle diameter of 0.051 μm, Vickers hardness of 7.5 GPa, ET300W produced by Ishihara Sangyo Kaisha, Ltd.)

The grinding medium A4: titania (average particle diameter of 0.26 μm, Vickers hardness of 7.5 GPa, ET500W produced by Ishihara Sangyo Kaisha, Ltd.)

The grinding medium A5: alumina (average particle diameter of 0.5 μm, Vickers hardness of 15 GPa, high-purity alumina AKP-20 produced by Sumitomo Chemical Co., Ltd.)

The grinding medium A6: alumina (average particle diameter of 0.75 μm, Vickers hardness of 15 GPa, AKP-3000 produced by Sumitomo Chemical Co., Ltd.)

The grinding medium A7: alumina (average particle diameter of 2 μm, Vickers hardness of 15 GPa, SUMICORUNDUM produced by Sumitomo Chemical Co., Ltd.)

The grinding medium A8: alumina (average particle diameter of 4.3 μm, Vickers hardness of 15 GPa, SUMICORUNDUM produced by Sumitomo Chemical Co., Ltd.)

The grinding medium A9: alumina (average particle diameter of 7 μm, Vickers hardness of 15 GPa, particulate alumina AM-28 produced by Sumitomo Chemical Co., Ltd.)

The grinding medium A10: alumina (average particle diameter of 12 μm, Vickers hardness of 15 GPa, particulate alumina AM-29 produced by Sumitomo Chemical Co., Ltd.)

The grinding medium A11: alumina (average particle diameter of 50 μm, Vickers hardness of 15 GPa, A13 produced by Nippon Light Metal Co., Ltd.)

The grinding medium A12: zirconia (average particle diameter of 100 μm, Vickers hardness of 12 GPa, TORAYCERAM produced by Toray Industries Inc.)

(3) The Grinding Medium B

The grinding medium B1: zirconia (average particle diameter of 100 μm, Vickers hardness of 12 GPa, TORAYCERAM produced by Toray Industries Inc.)

The grinding medium B2: zirconia (average particle diameter of 200 μm, Vickers hardness of 12 GPa, TORAYCERAM produced by Toray Industries Inc.)

The grinding medium B3: zirconia (average particle diameter of 300 μm, Vickers hardness of 12 GPa, TORAYCERAM produced by Toray Industries Inc.)

The grinding medium B4: zirbonia (average particle diameter of 500 μm, Vickers hardness of 12 GPa, TORAYCERAM produced by Toray Industries Inc.)

The grinding medium B5: zirconia (average particle diameter of 800 μm, Vickers hardness of 12 GPa, TORAYCERAM produced by Toray Industries Inc.)

The grinding medium B6: zirconia (average particle diameter of 1000 μm, Vickers hardness of 12 GPa, TORAYCERAM produced by Toray Industries Inc.)

The grinding medium B7: alumina (average particle diameter of 2 μm, Vickers hardness of 15 GPa, SUMICORUNDUM produced by Sumitomo Chemical Co., Ltd.)

<Examples 1 to 24 and Comparative Examples 1 to 6>

The grinding method above was performed on the basis of materials and ratios described in Tables 1 to 5. Only the grinding medium B was used in Comparative Example 1 without adding the grinding medium A, and the grinding was performed in others in the same manner as Example 3. The variations in the ratio of the average particle diameter of the grinding medium A to the average particle diameter of the product to be ground by changing the average particle diameter of the product to be ground were shown in Table 1, the variations in the ratio of the average particle diameter of the grinding medium A to the average particle diameter of the product to be ground by changing the average particle diameter of the grinding medium A were shown in Table 2, the variations in the ratio of the average particle diameter of the grinding medium B to the average particle diameter of the product to be ground by changing the average particle diameter of the grinding medium B were shown in Table 3, and the variations in the volume ratio of the product to be ground and the grinding medium A were shown in Table 4.

In each Example, the average particle diameter of the obtained powder particles reached to 0.7 μm or less as an objective. On the other hand, in Comparative Examples shown in Table 5, any case did not reach the objective.

TABLE 1

| | Before being ground | | | | | |
|---|---|---|---|---|---|---|
| | The product to be ground | | The grinding medium A | | The ratio of the average particle diameter of the grinding medium A to the average particle diameter of the product to be ground before being ground | The product to be ground:the grinding medium A (volume ratio) |
| No. | Materials | The average particle diameter (μm) | Materials | The average particle diameter (μm) | | |
| Example 1 | Glass 1 | 0.8 | The grinding medium A4 (titania) | 0.26 | 0.33 | 1:0.25 |
| Example 2 | Glass 2 | 1.1 | The grinding medium A4 (titania) | 0.26 | 0.24 | 1:0.25 |
| Example 3 | Glass 3 | 2.1 | The grinding medium A4 (titania) | 0.26 | 0.12 | 1:0.25 |
| Example 4 | Glass 4 | 5 | The grinding medium A4 (titania) | 0.26 | 0.05 | 1:0.25 |
| Example 5 | Glass 5 | 9 | The grinding medium A4 (titania) | 0.26 | 0.03 | 1:0.25 |

TABLE 1-continued

| | Before being ground | | The ratio of the average particle diameter of the grinding medium B to the average particle diameter of the product to be ground before being ground | After being ground | |
|---|---|---|---|---|---|
| | The grinding medium B | | | | |
| No. | Materials | The average particle diameter (μm) | | The average particle diameter of the ground product (μm) | The average particle diameter of a mixture of the ground product and the grinding medium A (μm) |
| Example 1 | The grinding medium B2 (zirconia) | 200 | 250 | 0.25 | 0.25 |
| Example 2 | The grinding medium B2 (zirconia) | 200 | 182 | 0.27 | 0.27 |
| Example 3 | The grinding medium B2 (zirconia) | 200 | 95 | 0.29 | 0.28 |
| Example 4 | The grinding medium B2 (zirconia) | 200 | 40 | 0.35 | 0.32 |
| Example 5 | The grinding medium B2 (zirconia) | 200 | 22 | 0.38 | 0.35 |

TABLE 2

| | Before being ground | | | | The ratio of the average particle diameter of the grinding medium A to the average particle diameter of the product to be ground before being ground | The product to be ground:the grinding medium A (volume ratio) |
|---|---|---|---|---|---|---|
| | The product to be ground | | The grinding medium A | | | |
| No. | Materials | The average particle diameter (μm) | Materials | The average particle diameter (μm) | | |
| Example 6 | Glass 3 | 2.1 | The grinding medium A1 (titania) | 0.013 | 0.01 | 1:0.25 |
| Example 7 | Glass 3 | 2.1 | The grinding medium A2 (alumina) | 0.021 | 0.01 | 1:0.25 |
| Exampl 8 | Glass 3 | 2.1 | The grinding medium A3 (titania) | 0.051 | 0.02 | 1:0.25 |
| Example 3 | Glass 3 | 2.1 | The grinding medium A4 (titania) | 0.26 | 0.12 | 1:0.25 |
| Example 9 | Glass 3 | 2.1 | The grinding medium A5 (alumina) | 0.5 | 0.24 | 1:0.25 |
| Example 10 | Glass 3 | 2.1 | The grinding medium A6 (alumina) | 0.75 | 0.36 | 1:0.25 |
| Example 11 | Glass 3 | 2.1 | The grinding medium A7 (alumina) | 2 | 0.95 | 1:0.25 |
| Example 12 | Glass 3 | 2.1 | The grinding medium A8 (alumina) | 4.3 | 2.05 | 1:0.25 |
| Example 13 | Glass 3 | 2.1 | The grinding medium A9 (alumina) | 7 | 3.33 | 1:0.25 |

TABLE 2-continued

| | Before being ground | | The ratio of the average particle diameter of the grinding medium B to the average particle diameter of the product to be ground before being ground | After being ground | |
|---|---|---|---|---|---|
| | The grinding medium B | | | | |
| No. | Materials | The average particle diameter (μm) | | The average particle diameter of the ground product (μm) | The average particle diameter of a mixture of the ground product and the grinding medium A (μm) |
| Example 6 | The grinding medium B2 (zirconia) | 200 | 95 | 0.62 | 0.62 |
| Example 7 | The grinding medium B2 (zirconia) | 200 | 95 | 0.62 | 0.45 |
| Exampl 8 | The grinding medium B2 (zirconia) | 200 | 95 | 0.55 | 0.47 |
| Example 3 | The grinding medium B2 (zirconia) | 200 | 95 | 0.29 | 0.28 |
| Example 9 | The grinding medium B2 (zirconia) | 200 | 95 | 0.31 | 0.40 |
| Example 10 | The grinding medium B2 (zirconia) | 200 | 95 | 0.4 | 0.53 |
| Example 11 | The grinding medium B2 (zirconia) | 200 | 95 | 0.48 | 0.50 |
| Example 12 | The grinding medium B2 (zirconia) | 200 | 95 | 0.49 | 0.52 |
| Example 13 | The grinding medium B2 (zirconia) | 200 | 95 | 0.52 | 1.10 |

TABLE 3

| | Before being ground | | | | | |
|---|---|---|---|---|---|---|
| | The product to be ground | | The grinding medium A | | The ratio of the average particle diameter of the grinding medium A to the average particle diameter of the product to be ground before being ground | The product to be ground:the grinding medium A (volume ratio) |
| No. | Materials | The average particle diameter (μm) | Materials | The average particle diameter (μm) | | |
| Example 14 | Glass 3 | 2.1 | The grinding medium A4 (titania) | 0.26 | 0.12 | 1:0.25 |
| Example 3 | Glass 3 | 2.1 | The grinding medium A4 (titania) | 0.26 | 0.12 | 1:0.25 |
| Example 15 | Glass 3 | 2.1 | The grinding medium A4 (titania) | 0.26 | 0.12 | 1:0.25 |
| Example 16 | Glass 3 | 2.1 | The grinding medium A4 (titania) | 0.26 | 0.12 | 1:0.25 |
| Example 17 | Glass 3 | 2.1 | The grinding medium A4 (titania) | 0.26 | 0.12 | 1:0.25 |

TABLE 3-continued

| | Before being ground | | The ratio of the average particle diameter of the grinding medium B to the average particle diameter of the product to be ground before being ground | After being ground | |
|---|---|---|---|---|---|
| | The grinding medium B | | | | |
| No. | Materials | The average particle diameter (μm) | | The average particle diameter of the ground product (μm) | The average particle diameter of a mixture of the ground product and the grinding medium A (μm) |
| Example 14 | The grinding medium B1 (zirconia) | 100 | 48 | 0.41 | 0.37 |
| Example 3 | The grinding medium B2 (zirconia) | 200 | 95 | 0.29 | 0.28 |
| Example 15 | The grinding medium B3 (zirconia) | 300 | 143 | 0.22 | 0.23 |
| Example 16 | The grinding medium B4 (zirconia) | 500 | 238 | 0.58 | 0.49 |
| Example 17 | The grinding medium B5 (zirconia) | 800 | 381 | 0.7 | 0.57 |

TABLE 4

| | Before being ground | | | | | |
|---|---|---|---|---|---|---|
| | The product to be ground | | The grinding medium A | | The ratio of the average particle diameter of the grinding medium A to the average particle diameter of the product to be ground before being ground | The product to be ground:the grinding medium A (volume ratio) |
| No. | Materials | The average particle diameter (μm) | Materials | The average particle diameter (μm) | | |
| Example 18 | Glass 3 | 2.1 | The grinding medium A4 (titania) | 0.26 | 0.12 | 1:0.05 |
| Example 19 | Glass 3 | 2.1 | The grinding medium A4 (titania) | 0.26 | 0.12 | 1:0.14 |
| Example 3 | Glass 3 | 2.1 | The grinding medium A4 (titania) | 0.26 | 0.12 | 1:0.25 |
| Example 20 | Glass 3 | 2.1 | The grinding medium A4 (titania) | 0.26 | 0.12 | 1:1 |
| Example 21 | Glass 3 | 2.1 | The grinding medium A4 (titania) | 0.26 | 0.12 | 1:5 |
| Example 22 | Glass 3 | 2.1 | The grinding medium A4 (titania) | 0.26 | 0.12 | 1:10 |
| Example 23 | Glass 3 | 2.1 | The grinding medium A4 (titania) | 0.26 | 0.12 | 1:20 |
| Example 24 | Glass 3 | 2.1 | The grinding medium A4 (titania) | 0.26 | 0.12 | 1:100 |

TABLE 4-continued

| | Before being ground | | | After being ground | |
|---|---|---|---|---|---|
| | The grinding medium B | | The ratio of the average particle diameter of the grinding medium B to the average particle diameter of the product to be ground before being ground | The average particle diameter of the ground product (μm) | The average particle diameter of a mixture of the ground product and the grinding medium A (μm) |
| No. | Materials | The average particle diameter (μm) | | | |
| Example 18 | The grinding medium B2 (zirconia) | 200 | 95 | 0.41 | 0.39 |
| Example 19 | The grinding medium B2 (zirconia) | 200 | 95 | 0.33 | 0.32 |
| Example 3 | The grinding medium B2 (zirconia) | 200 | 95 | 0.29 | 0.28 |
| Example 20 | The grinding medium B2 (zirconia) | 200 | 95 | 0.29 | 0.28 |
| Example 21 | The grinding medium B2 (zirconia) | 200 | 95 | 0.28 | 0.27 |
| Example 22 | The grinding medium B2 (zirconia) | 200 | 95 | 0.28 | 0.27 |
| Example 23 | The grinding medium B2 (zirconia) | 200 | 95 | 0.26 | 0.26 |
| Example 24 | The grinding medium B2 (zirconia) | 200 | 95 | 0.25 | 0.26 |

TABLE 5

| | Before being ground | | | | | |
|---|---|---|---|---|---|---|
| | The product to be ground | | The grinding medium A | | The ratio of the average particle diameter of the grinding medium A to the average particle diameter of the product to be ground before being ground | The product to be ground:the grinding medium A (volume ratio) |
| No. | Materials | The average particle diameter (μm) | Materials | The average particle diameter (μm) | | |
| Comparative Example 1 | Glass 3 | 2.1 | — | — | — | — |
| Comparative Example 2 | Glass 3 | 2.1 | The grinding medium A12 (zirconia) | 100 | 48 | 1:0.25 |
| Comparative Example 3 | Glass 3 | 2.1 | The grinding medium A4 (titania) | 0.26 | 0.12 | 1:0.25 |
| Comparative Example 4 | Glass 3 | 2.1 | The grinding medium A4 (titania) | 0.26 | 0.12 | 1:0.25 |
| Comparative Example 5 | Glass 3 | 2.1 | The grinding medium A10 (alumina) | 12 | 5.71 | 1:0.25 |
| Comparative Example 6 | Glass 3 | 2.1 | The grinding medium A11 (alumina) | 50 | 23.81 | 1:0.25 |

TABLE 5-continued

| | | Before being ground | | After being ground | |
|---|---|---|---|---|---|
| | | The grinding medium B | | The ratio of the average particle diameter of the grinding medium B to the average particle diameter of the product to be ground before being ground | |
| No. | Materials | The average particle diameter (μm) | | The average particle diameter of the ground product (μm) | The average particle diameter of a mixture of the ground product and the grinding medium A (μm) |
| Comparative Example 1 | The grinding medium B2 (zirconia) | 200 | — | 0.87 | — |
| Comparative Example 2 | The grinding medium B2 (zirconia) | 200 | 95 | 0.78 | 71.81 |
| Comparative Example 3 | The grinding medium B6 (zirconia) | 1000 | 476 | 0.91 | 0.72 |
| Comparative Example 4 | The grinding medium B7 (alumina) | 2 | 1 | 2 | 1.51 |
| Comparative Example 5 | The grinding medium B2 (zirconia) | 200 | 95 | 0.75 | 1.80 |
| Comparative Example 6 | The grinding medium B2 (zirconia) | 200 | 95 | 0.76 | 6.60 |

<Example 25>

The paste for an electron emission source of field emission was produced in the following manner. A double-wall-layer-CNT (produced by Toray Industries Inc.) was used as the CNT. 100 parts by weight of the CNT, 1000 parts by weight of the glass powder particles obtained in Example 1, and 5 parts by weight of Solsperse 2400GR (produced by Avecia Inc.) as a dispersant were weighed, and thereafter 2500 parts by weight of photosensitive polymer solution (such that 0.4 equivalent weight of glycidyl methacrylate was subject to addition reaction (a weight-average molecular weight of 43000, an acid value of 100) with respect to carboxyl groups of a copolymer composed of methacrylic acid monomer/methyl methacrylate monomer/styrene monomer=40/40/30 (molar ratio), and dissolved in terpineol by 40% by weight) as a photosensitive organic component, 400 parts by weight of a photosensitive monomer (tetrapropylene glycol dimethacrylate), and 400 parts by weight of the photoinitiator IC369 (2-benzil-2-dimethylamino-1-(4-morpholinophenyl)butanone-1, produced by Chiba Specialty Chemicals Co., Ltd.) were added thereto and kneaded with a three roller mill to obtain the paste for an electron emission source. The terpineol as solvent was added by 4000 parts by weight for adjusting viscosity.

Subsequently, an electron emitter was produced in the following manner. ITO was formed on a glass substrate by sputtering to form a cathode electrode. The paste for an electron emission source obtained as described above was printed with a pattern of 50 mm square oh the obtained cathode electrode by a screen printing method. Next, the paste was exposed to ultraviolet rays from above by an ultra-high pressure mercury-vapor lamp with an output of 50 via a negative chrome mask (20 μmφ, 40 μm pitch). Then, the paste was developed by showering 1% by weight of an aqueous sodium carbonate solution thereon for 150 seconds, and washed in water with a shower spray to remove the photo-uncured portion. The pattern here obtained was heated at a temperature of 450° C. in the atmosphere to obtain a CNT film. Thereafter, the CNT film was subject to raising treatment by a tape with a peeling strength of 0.5 N/20 mm. Phosphor was printed on another glass substrate on which ITO sputtered to produce an anode substrate. These two glass substrates were stuck together with a gap film of 200 μm between them to obtain an electron emitter.

With regard to this electron emitter, a voltage of 1 to 5 kV is supplied to the anode electrode to confirm phosphor luminescence by electron emission obtained from the CNT. Then, when the pattern shape was evaluated by a scanning electron microscope (S4800, manufactured by Hitachi, Ltd.), the irregularities in the periphery of the pattern was within a range of less than 0.3 μm, and abnormality was not particularly found. Also, arc discharge was not caused.

<Example 26>

The photosensitive insulating layer paste for field emission was produced in the following manner. 450 parts by weight of photosensitive polymer solution (such that 0.4 equivalent weight of glycidyl methacrylate was subject to addition reaction (a weight-average molecular weight of 43000, an acid value of 100) with respect to carboxyl groups of a copolymer composed of methacrylic acid monomer/methyl methacrylate monomer/styrene monomer=40/40/30 (molar ratio), and dissolved in terpineol by 40% by weight), 70 parts by weight of a photosensitive monomer (tetrapropylene glycol dimethacrylate), and 70 parts by weight of the photoinitiator IC369 (2-benzil-2-dimethylamino-1-(4-morpholinophenyl)butanone-1, produced by Chiba Specialty Chemicals Co., Ltd.), as photosensitive organic components, were added to 1000 parts by weight of the glass powder particles obtained in Example 1, and kneaded with a three roller mill to obtain the photosensitive insulating layer paste. The terpineol as solvent was added by 100 parts by weight for adjusting viscosity.

Subsequently, an insulating layer having an emitter hole with a diameter of 30 μm was produced in the following manner. ITO was formed on a glass substrate by sputtering to form a cathode electrode. The photosensitive insulating layer paste obtained in the above-mentioned manner was solid-printed thereon with a film thickness after drying of 20 μm by a screen printing method. Next, the paste was exposed to ultraviolet rays from above by an ultra-high pressure mercury-vapor lamp with an output of 50 mW/cm$^2$ via a negative chrome mask (25 μmφ, 45 μm pitch). Then, the paste was developed by showering 0.01% by weight of an aqueous sodium carbonate solution thereon for 150 seconds, and washed in water with a shower spray to remove the photo-uncured portion. The pattern here obtained was heated at a temperature of 450° C. in the atmosphere to obtain an insulating layer having an emitter hole with a diameter of 30 μm. The surface roughness Ra on the flat portion of the insulating layer measured 0.01.

<Comparative Example 7>

The paste for an electron emission source and electron emitter were produced and evaluated in the same manner as Example 25 except for replacing the glass powder particles obtained in Example 1 with the glass fine particles obtained in Comparative Example 1. Two or more irregularities of 0.5 μm or more were observed in the periphery of the pattern. When a voltage of 1 to 5 kV is supplied to the anode electrode of the electron emitter, phosphor luminescence by electron emission obtained from the CNT was confirmed and arc discharge resulting from the irregularities in the periphery of the pattern was caused.

<Comparative Example 8>

The photosensitive insulating layer paste and insulating layer having an emitter hole with a diameter of 30 μm were produced in the same manner as Example 26 except for replacing the glass powder particles obtained in Example 1 with the glass fine particles obtained in Comparative Example 1. The surface roughness Ra on the flat portion of the insulating layer measured 0.3.

The invention claimed is:

1. A composition for an electron emission source of field emission comprising a mixture of powder particles including powder (I) and powder (II) and a carbon-based material, wherein
   the powder (I) is glass having an average particle diameter of 50 to 700 nm and a softening temperature under load of 300 to 500° C.,
   the powder (II) is at least any one of silica, alumina, titania, zirconia, yttria, ceria, magnesia, zinc oxide, manganese oxide, copper oxide, iron oxide, holmium oxide, lead oxide and tin oxide, and
   the carbon-based material is at least one selected from the group consisting of carbon nanotubes, carbon nanohorns, carbon nanocoils, fullerenes and carbon black.

2. The composition for an electron emission source of field emission according to claim 1 further comprising binder resin and a solvent.

3. The composition for an electron emission source of field emission according to claim 1, wherein the powder (I) has an average particle diameter of 220 to 700 nm.

4. The composition for an electron emission source of field emission according to claim 1, wherein the powder (II) has an average particle diameter of 13 to 7000 nm.

* * * * *